March 26, 1963 F. F. HESSLER ET AL 3,082,891
HYDRAULIC CABLE REEL TRAILER
Filed Dec. 2, 1958 2 Sheets-Sheet 1

INVENTORS
F. F. HESSLER
AND
BY H. C. STRICKER JR
Robb & Robb
Attorneys

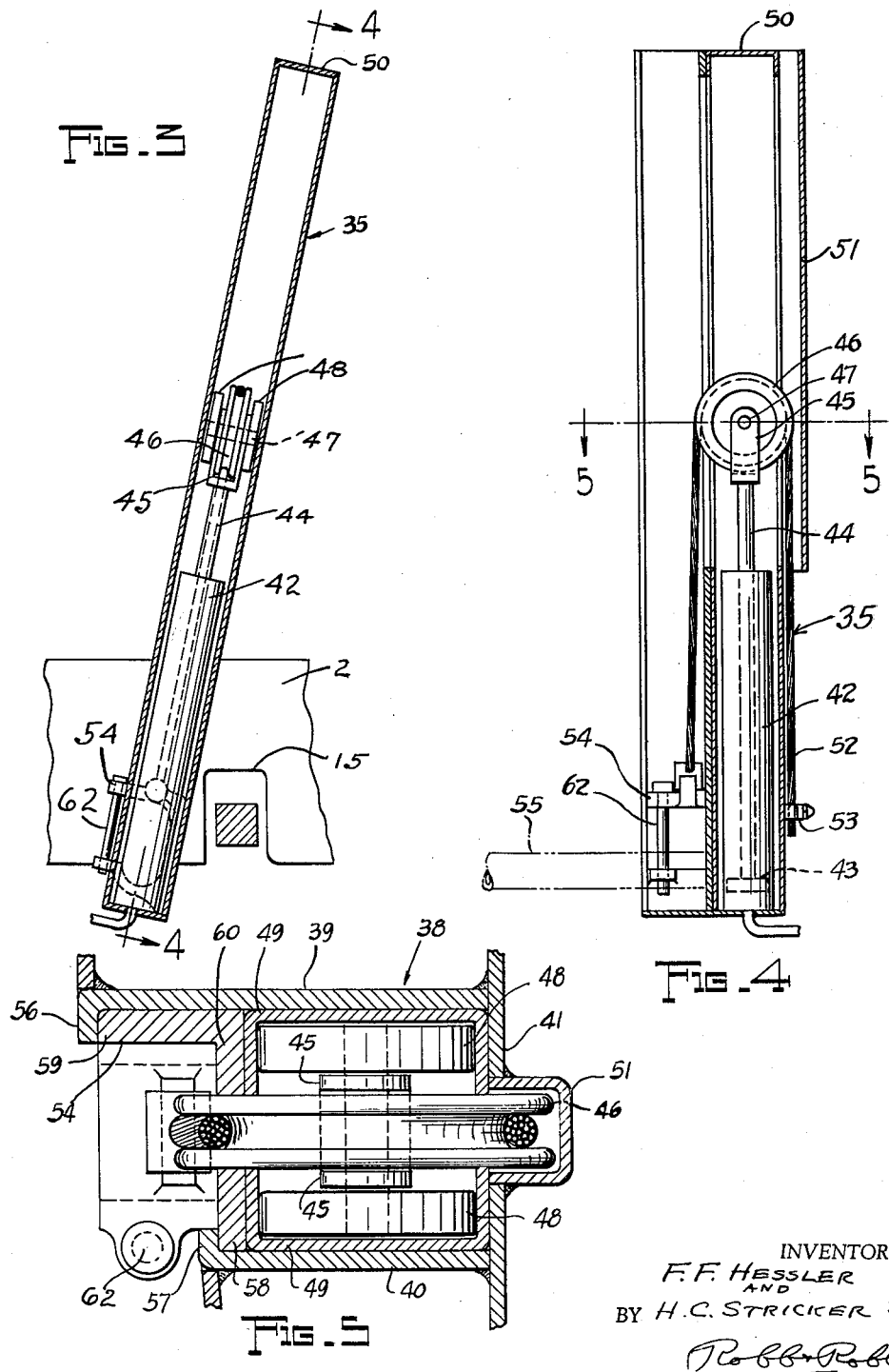

United States Patent Office 3,082,891
Patented Mar. 26, 1963

3,082,891
HYDRAULIC CABLE REEL TRAILER
Frank F. Hessler and Henry C. Stricker, Jr., Edgerton, Wis., assignors, by mesne assignments, to Highway Trailer Industries, Inc., Edgerton, Wis., a corporation of Delaware
Filed Dec. 2, 1958, Ser. No. 777,748
2 Claims. (Cl. 214—394)

This invention relates to vehicles, and primarily to trailer vehicles adapted to transport extremely heavy objects, and which vehicles are likewise suitable for facilitating distribution of material carried thereby.

More particularly, the invention hereof is directed to what is called a cable reel trailer, primarily, although obviously the construction is adaptable for other purposes beside that for which it is specifically intended, such trailers being used by utility companies to transport cables such as telephone cable thereby, which is usually furnished in the form of large reels weighing thousands of pounds.

Heretofore in the art, many different kinds of trailers for the specific purpose hereof have been designed, and the trailer of this invention is intended to provide for greater ease of operation and manipulation, involving the handling of reels of cable, the range of reel sizes being substantially greater than heretofore usually provided for and the ease of handling being substantially increased by availing of instrumentalities which multiply the individual efforts of the person manipulating the vehicle.

One of the problems associated with cable reel trailers is to provide structures sufficiently strong to enable the vehicle to be transported over various types of terrain and facilitate the leveling and handling of the reels in the unrolling process which is resorted to during the course of such movement or from a stationary position as required under many conditions.

Another phase of consideration in vehicles of this type is to decrease the effect of great mass of unsprung weight which is commonly carried by such trailers or vehicles and thus materially increase the life thereof as well as decrease the harmful effects upon the towing vehicle.

It is therefore a principal object of this invention to provide a cable reel trailer in which a wide range of cable reel diameters and widths may be handled and facilitate the handling by a minimum of effort on the part of the person desiring to handle the same.

It is another object of this invention to provide a cable reel trailer of novel construction wherein operation of the instrumentalities providing for manipulation of the cable reels into positions from a position of rest or storage into a transporting position is facilitated and the weight is transferred desirably onto the towing vehicle in part, so that the speed of movement of the unit as a whole may be materially increased.

It is another object of this invention to provide a novel frame structure or chassis for a trailer of the type herein generally under consideration which places substantially all of the weight carried thereby in a sprung condition thus materially increasing the ease of movement as well as the lift of the individual components of the vehicle.

Yet a further object of the invention is to provide a novel trailer of the class described, which involves the combination of hydraulic and cable instrumentalities whereby to multiply the lifting effect produced thereby, and thus materially reduce the efforts required to effect lifting of cable reels of various sizes into transporting position.

Other and further objects of the invention will be understood from a consideration of the specification appended hereto and disclosed in the drawings, wherein:

FIGURE 3 is a fragmentary view largely in section illustrating certain hoisting instrumentalities availed of.

FIGURE 4 is a sectional view taken about on the line 4—4 of FIGURE 3 looking in the direction of the arrows.

FIGURE 5 is a transverse sectional view, somewhat fragmentary in nature, taken about on the line 5—5 of FIGURE 4 looking in the direction of the arrows.

Figure 1:
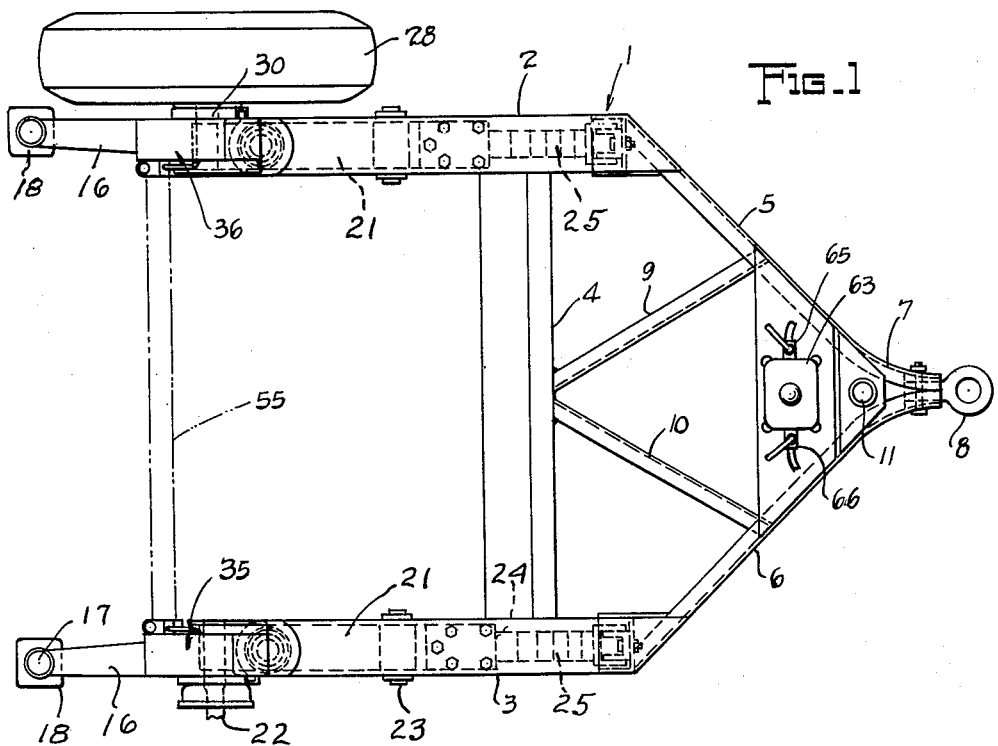
FIGURE 1 is a top plan view partly fragmentary, illustrating the general arrangement of the parts of the vehicle hereinafter described.

The vehicle hereof is, as previously suggested, a trailer type of unit and is specifically disclosed in FIGURE 1 in detail, wherein is illustrated a generally U-shaped frame denoted 1 comprised of the opposite side members 2 and 3, which members are connected by a transverse part 4 near their forward ends, the extreme forward part consisting of the converging opposite members 5 and 6 which meet in a hitch unit 7, which latter is provided with a towing eye 8. Suitable braces 9 and 10 are provided to assist in the general structural rigidity of the frame.

Figure 2:
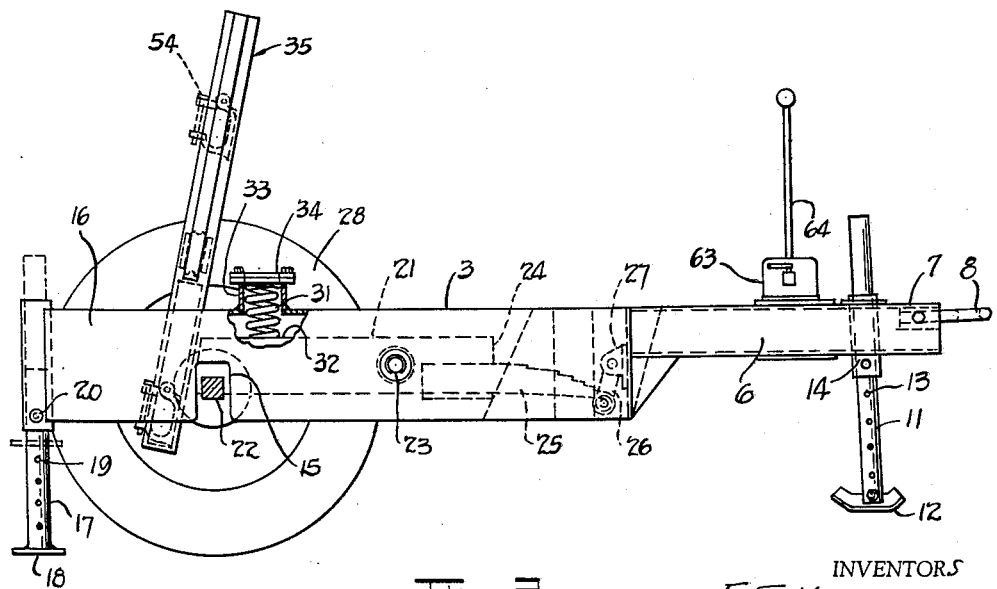
FIGURE 2 is a side elevational view of the vehicle disclosed in FIGURE 1.

The forwardly converging frame members 5 and 6 are additionally equipped at their connection point, with a suitably adjustable leg member 11, more particularly shown in elevation in FIGURE 2 as being equipped with a shoe 12 at the lower end thereof. Suitable openings are provided in the leg 11 indicated at 13 with a corresponding fixed member 14 in which a pin may be inserted to enter one of the holes 13 and thus position the towing eye 8 as desired.

The side frame members 2 and 3 are substantially identical and thus only the member 3 will be described in detail, because the other member 2 has corresponding parts but of the opposite hand in some instances.

With the foregoing in mind, the side members such as 3 are comprised of a box section, which is hollow and which, near its rear portion is provided with a notch such as 15 for purposes which will be explained subsequently.

The rear portion 16 of the frame member 3 is equipped with a suitable leg member such as 17 which can act as an outrigger, being provided at its lower end with a foot portion 18 thereon. Suitable adjusting openings 19 are provided in the member 17 and a cross pin 20 may be entered in any one of the openings in accordance with the terrain and attitude which is desired to be assumed by the frame as a whole. The legs such as 11 and 17 may be raised into the uppermost position for travel movement when desired.

Within the frame member or box part 3, there is located a suitable beam illustrated in dotted lines in FIGURE 2 denoted 21, which beam is of heavy section and is provided at its rear end with a stub axle 22 suitably fixed to the rear of the beam 21 and extending outwardly through the notched portion 15 previously mentioned.

The beam 21 is pivotally connected to the frame member 3 as at 23 and at its forward end 24 connected to a heavy leaf spring 25, the leaf spring in turn connected by means of a shackle 26 to the frame member 3 as by means of the perch designated 27. The stub axle 22 is of course to be equipped with a wheel such as is shown on the opposite side and denoted 28, whereby the frame is resiliently or completely supported by the springs such as 25 acting through the beams 21, it being understood that of course a corresponding beam to the beam 21 is provided in the frame member 2 of the opposite side and an axle 30 likewise being provided for that beam member.

In order to provide additional resilient support for the frame and any load imposed thereon, a coil spring such as 31 is shown as engaging with the upper portion of the beam 21 at 32 and being housed in an upstanding housing 33 suitably rigidly fastened to the upper surface of the frame member 3 and being equipped with a cap 34 suitably fastened thereto. The cap 34 is of course removable as desired so that the spring 31 may be inserted and the cap replaced to retain the spring in operative position. A corresponding arrangement is provided at the opposite side for the frame member 2 and beam contained therein.

With the foregoing, the chassis having now been largely described and substantially in detail, the means for raising and lowering the cable reels on the frame will now be described in conjunction with a detailed disclosure of the cable reel supporting instrumentalities which are shown in greater detail in FIGURES 3 to 5 inclusive.

Adverting momentarily to the FIGURE 2 disclosure, it will be seen that the raising and lowering instrumentalities are provided at opposite sides adjacent the axles and suitably fixed to the side members 2 and 3, these instrumentalities being generally designated 35 and 36, the member 35 being subject of the detailed disclosure hereinafter set forth.

Turning therefore to the FIGURE 3 illustration, the unit 35 is shown as comprising a substantially U-shaped guide member 38 including the side 39, the side 40 opposite thereto and somewhat shorter in width and a connecting side 41, as indicated in detail in FIGURE 5.

The device 35 as well as the device 36, is inclined forwardly and suitably fastened to the corresponding side member in about the position shown in FIGURES 2 and 3, there being an hydraulic cylinder unit 42 mounted at the lower portion of said member in fixed position and having operatively movable therein a suitable piston such as 43 connected to a piston rod 44 extending upwardly from the cylinder unit 42. At the upper end of the piston rod 44 there is mounted a yoke 45 which in turn carries a pulley 46 on a pivot 47. Additionally mounted on the pivot 47 are the guide rollers 48 shown in their operative position spaced from the pulley 46 by the yoke 45.

The guide rollers 48 move in a suitable guide structure comprising the guides 49 mounted within the U-shaped member 38, the guides 49 acting to additionally provide a guiding movement of the pulley 46 in upward and downward operation.

The pulley 46, being arranged to move in the guides 49, which incidentally are connected at their upper ends as at 50 as shown in FIGURE 4, as well as FIGURE 3, extends outwardly from said guides and is desirably provided with a cover of generally U-shaped cross sectional configuration as indicated in FIGURE 5 denoted 51, the cover 51 likewise acting to prevent the cable denoted 52 from becoming unreeved with respect to the pulley 46.

The cable 52 is fixed at one end by a dead-end connection 53 to the member 38 as indicated in FIGURE 4, the cable extending upwardly and over the pulley or sheave 46 and thence downwardly to a saddle member designated 54, being fastened thereto in any suitable manner so as to effect movement of the saddle as will now be set forth.

The saddle 54 is intended to receive therein a shaft 55 upon which cable reels may be supported, the saddle being adapted to move upwardly and downwardly within the member 38 by reasons of the lips 56 and 57 provided which interengage with a corresponding tongue 58 and a portion 59 to maintain the saddle in position, a portion of the saddle indicated at 60 being operatively engaged with the guides 49 as shown in FIGURE 5. A suitable pin 62 is provided to engage the saddle and maintain the shaft 55 in position under travel conditions, the saddle moving upwardly and downwardly under the action of the hydraulic piston and cylinder arrangement previously described as including the parts 42, 43, and 44 as well as the pulley or sheave 46 associated therewith.

The structure just explained in detail as comprising the hoisting device is duplicated at the opposite side of the frame and in order to provide for actuation of the hydraulic instrumentalities described, a suitable hand pump such as 63 is shown in FIGURES 1 and 2 operable by a lever 64, suitable connections being provided to the respective cylinders such as 42. Actuation of the hand pump 63 by the handle 64 in a back and forth movement will cause hydraulic fluid to be delivered to the piston and cylinder unit, and valves indicated at 65 and 66 may be manipulated so as to regulate the admission of fluid to the corresponding cylinders whereby one or both of the piston and cylinder units may be actuated to simultaneously or controllably position the shaft 55 as desired.

The provision of the hoisting devices in an inclined condition, as indicated in the FIGURES 2 and 3, is of a great advantage, in handling reels of various sizes, since this permits the shaft such as 55 to be lowered into any preferred position, to thereby be inserted in the corresponding reel and thereafter engaged with the saddles whereby subsequent manipulation of the pump 63 will cause the saddles to be raised and carry the shaft 55 therewith.

When it is desired to position a reel in the trailer for subsequent travel to any desired location, the trailer hereof is so arranged that a single man can operate the device by inserting the shaft in the cable reel and backing the device therearound so that the saddles provided are engaged with the shaft, thereafter inserting pins such as 62 to maintain the shaft in position. Subsequently by manipulation of the legs 17 and 11, the trailer may be maintained in its position as shown in FIGURE 2 for example and suitable manipulation of the hydraulic hand pump 63 is resorted to. This will carry upwardly the saddles 54, the pulley arrangement being such that for every inch of movement of the piston rods 44, double the amount of movement will be imparted to the saddles 54. This of course will simplify and reduce the cost of the hydraulic piston and cylinder units and when the saddles 54 have reached the desired travel position, as indicated in the upper dotted lines showing the saddles in FIGURE 2, the centerline of the shaft 55 will be ahead of the axles 22. This is a desirable arrangement because sufficient amount of weight will be imparted to the forward part of the trailer to prevent a whipping motion during travel and yet the saddles are arranged so that they will accept reels of various diameters raising them from positions behind the axles 22 to positions ahead of the axles for travel movement, at least the relationship of the respective centerlines will be this related.

The towing eye 8 is intended to be connected to a towing vehicle and the legs 11 and 17 may be raised into their uppermost positions for travel. During the course of travel movement, the spring arrangement is such that the shock load transmitted to the towing vehicle is at a minimum and likewise the shock on the frame 1 is reduced desirably.

We claim:

1. In cable reel transporting means of the class described, in combination, a rearwardly open substantially U-shaped frame, wheel and axle means connected to said frame and arranged to support the same adjacent its free ends, the frame including box members comprising the sides thereof, an axle beam is pivotally mounted in each member, each axle is connected to the rear of the corresponding beam, the forward end of each beam is resiliently connected to its corresponding side of the frame, cable reel supporting instrumentalities connected to the frame at each side near the axles aforesaid, said instrumentalities including parts for engaging a reel supporting shaft, and guide means in which to move the parts from positions wherein the centerline of said shaft is in rear of and below the centerline of said axles, upwardly in straight line to other positions with the centerline of said shaft above and ahead of the centerline of said axles.

2. In cable reel transporting means of the class described, in combination, a rearwardly open substantially U-shaped frame, wheel and axle means connected to said frame and arranged to support the same adjacent its free ends, the frame including box members comprising the sides thereof, an axle beam pivotally mounted in each member, each axle connected to the rear of the corresponding beam, the forward end of each beam resiliently connected to its corresponding side of the frame, a helper spring mounted above each beam near the rear end thereof, said springs being fastened to the frame, cable reel supporting instrumentalities connected to the frame at each side near the axles aforesaid, said instrumentalities including parts for engaging a reel supporting shaft, and guide means in which to move the parts from positions wherein the centerline of said shaft is in rear of and below the centerline of said axles, upwardly in straight line to other positions with the centerline of said shaft above and ahead of the centerline of said axles.

References Cited in the file of this patent
UNITED STATES PATENTS

| | | |
|---|---|---|
| 1,864,676 | Smith et al. | June 28, 1932 |
| 1,954,345 | Burrows | Apr. 10, 1934 |
| 2,032,721 | Schaefer | Mar. 3, 1936 |
| 2,200,177 | Klavik | May 7, 1940 |
| 2,514,825 | Zenko | July 11, 1950 |
| 2,676,716 | Sallis | Apr. 27, 1954 |
| 2,706,056 | Talley et al. | Apr. 12, 1955 |
| 2,775,357 | De Arment | Dec. 25, 1956 |
| 2,848,123 | Keys | Aug. 19, 1958 |
| 2,852,148 | Jones | Sept. 16, 1958 |
| 2,875,852 | Morrell | Mar. 3, 1959 |